United States Patent
Newhart

(10) Patent No.: US 8,355,501 B1
(45) Date of Patent: Jan. 15, 2013

(54) METHOD OF COLLISION-FREE HASHING FOR NEAR-MATCH INPUTS

(75) Inventor: Donald W. Newhart, Elkridge, MD (US)

(73) Assignee: The United States of America as Represented by the Director, National Security Agency, Washington, DC (US)

(*) Notice: Subject to any disclaimer, the term of this patent is extended or adjusted under 35 U.S.C. 154(b) by 0 days.

(21) Appl. No.: 13/385,474

(22) Filed: Feb. 3, 2012

Related U.S. Application Data

(62) Division of application No. 12/454,691, filed on May 21, 2009.

(51) Int. Cl.
*H04K 1/00* (2006.01)
(52) U.S. Cl. .......................................... 380/28
(58) Field of Classification Search ...................... 380/28
See application file for complete search history.

(56) References Cited

U.S. PATENT DOCUMENTS

| | | | |
|---|---|---|---|
| 7,257,224 B2* | 8/2007 | Koshiba | 380/28 |
| 7,382,876 B2 | 6/2008 | Lauter et al. | |
| 2007/0291934 A1 | 12/2007 | Volkovs et al. | |
| 2009/0067620 A1 | 3/2009 | Billet et al. | |
| 2009/0085780 A1 | 4/2009 | Vijayrangan | |
| 2010/0111296 A1* | 5/2010 | Brown et al. | 380/28 |

* cited by examiner

*Primary Examiner* — Krista Zele
*Assistant Examiner* — Esther Benoit
(74) *Attorney, Agent, or Firm* — Robert D. Morelli

(57) ABSTRACT

A method of collision-free hashing of near-match by selecting bit positions d that differ between a first input and a second input, selecting a degree of a first polynomial for a cyclic code proportional to d, selecting a bit length i of the first input and the second input, selecting a bit length cv of a check value greater than or equal to d, setting $n \geq i+cv$, generating the first polynomial that divides $x^n+1$, factoring the first polynomial into a second and a third polynomials, receiving the first input, dividing the first input by the second polynomial, dividing the first input by the third polynomial, and identifying the results of the last two steps as a hash of the first input.

4 Claims, 1 Drawing Sheet

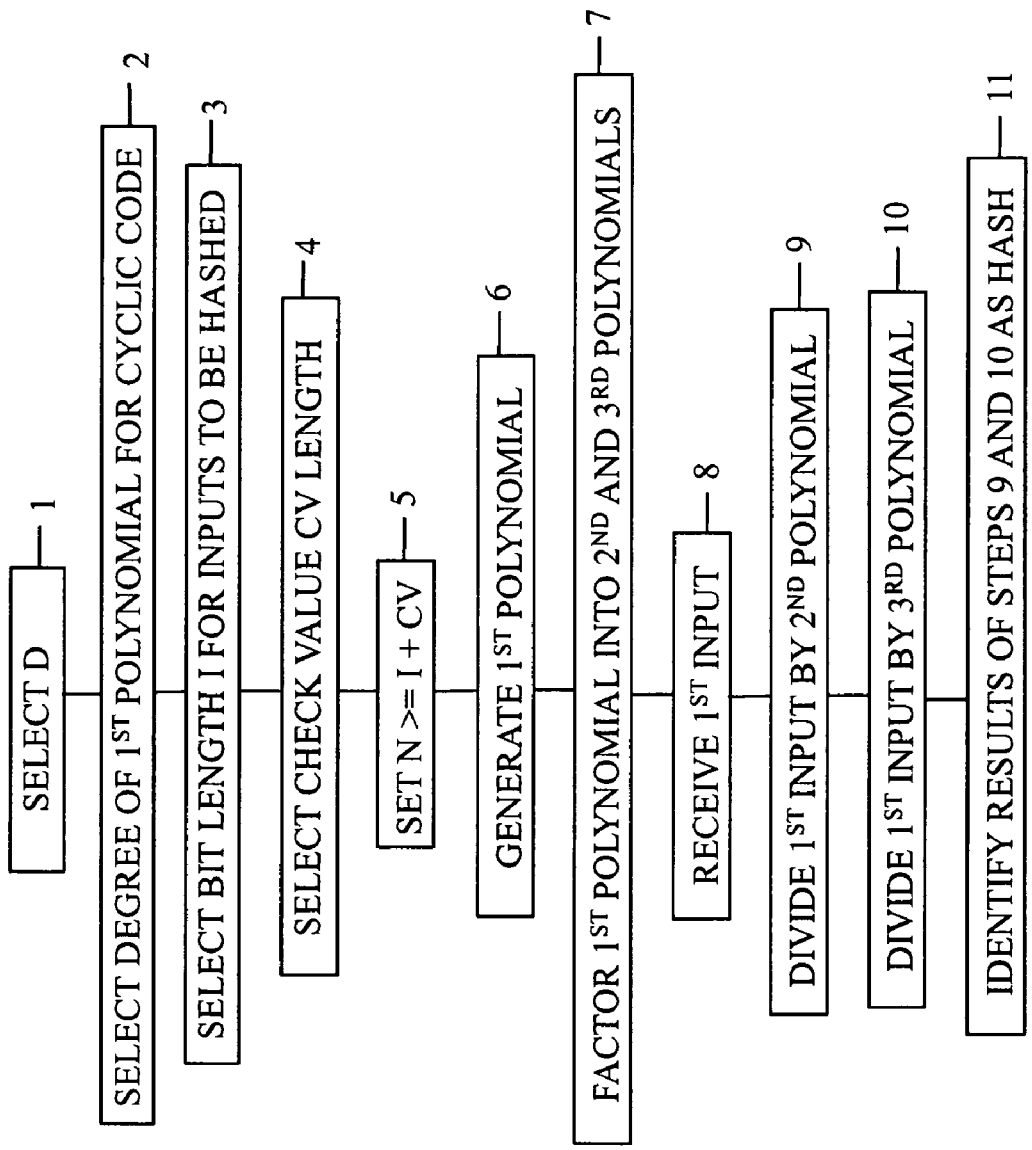

METHOD OF COLLISION-FREE HASHING FOR NEAR-MATCH INPUTS

CROSS-REFERENCE TO RELATED APPLICATION

The present invention is a division of U.S. patent application Ser. No. 12/454,691, entitled "DEVICE FOR AND METHOD OF COLLISION-FREE HASHING FOR NEAR-MATCH INPUTS," filed May 21, 2009.

FIELD OF INVENTION

The present invention relates, in general, to cryptography and, in particular, to particular algorithmic function encoding.

BACKGROUND OF THE INVENTION

A hash function is a function that receives input data of an arbitrary bit length and generates an output of a fixed bit length, where the length of the output is user-definable. Hash functions are useful for generating message authentication codes and Bloom filters for determining if a data element is a member of a set.

Since a hash function maps data of a certain length to data of a shorter length, there are fewer possible outputs then there are inputs. So, some inputs will map to the same output. Such a mapping is commonly referred to as a collision. Knowing what inputs to a hash function cause collisions could provide a person with information that would help that person compromise a cryptographic algorithm that uses the hash function.

Since collisions are inherent in any hash function that receives a larger input then the output it produces, one cannot totally eliminate collisions. However, one may make it more time consuming to find collisions by ensuring that collisions occur only for inputs that differ from each other by more than a trivial number of bit locations so that one must spend more time searching for inputs that cause collisions. Therefore, there is a need for a hash function that does not produce collisions for inputs that are near matches of each other, where a near match is one where the number of bit locations that differ is small and, therefore, could more easily be found than if the inputs were not near-matches.

U.S. Pat. No. 7,382,876, entitled "HASH FUNCTION CONSTRUCTION FROM EXPANDER GRAPHS," discloses a hash function in which it is difficult to find collisions by dividing an input to a hash function into segments, walking an expander graph based on respective input segments, determining a label of the last vertex walked, and outputting the label as the result of the hash function. U.S. Pat. No. 7,382,876 is hereby incorporated by reference into the present specification.

U.S. Pat. Appl. No. 20070291934, entitled "METHODS, SYSTEMS AND COMPUTER PROGRAM FOR POLYNOMIAL BASED HASHING AND MESSAGE AUTHENTICATION CODING WITH SEPARATE GENERATION OF SPECTRUMS," discloses a hash function that represents an initial sequence of bits as a specially constructed set of polynomials, transforms the set by masking, partitions the transformed set into a plurality of classes, forms a bit string during partitioning, factoring for each class each of the polynomials, collecting the factors, wrapping the factors, organizing the wrappings, and performing an exponentiation of the organizations to obtain a hash value. U.S. Pat. Appl. No. 20070291934 is hereby incorporated by reference into the present specification.

U.S. Pat. Appl. No. 20090067620, entitled "CRYPTOGRAPHIC HASHING DEVICE AND METHOD," discloses a hash function that forms a sequence of data m-tuples from a message, where m is a positive integer, interatively calculating successive output p-tuples, where p is a positive integer corresponding to the sequence of data m-tuples as a function of at least one set of multivariate polynomials defined over a finite field, and determining a hash value as a function of the last p-tuple output. U.S. Pat. Appl. No. 20090067620 is hereby incorporated by reference into the present specification.

U.S. Pat. Appl. No. 20090085780, entitled "METHOD FOR PREVENTING AND DETECTING HASH COLLISIONS OF DATA DURING DATA TRANSMISSION," discloses a means for avoiding hash collisions by pre-processing a message to increase randomness and reducing redundancy in a manner that includes a bit shuffler, a compression T-function, and a linear feedback shift register. U.S. Pat. Appl. No. 20090085780 is hereby incorporated by reference into the present specification.

SUMMARY OF THE INVENTION

It is an object of the present invention to generate a collision-free hash for near-match inputs.

The present invention is a method of collision-free hashing for near-match inputs.

The first step of the method is selecting a user-definable minimum number of bit positions d that must differ between a first input and a second input before a collision of hashes of the first input and the second input can occur.

The second step of the method is selecting a user-definable degree of a first polynomial for a cyclic code, where the degree of the first polynomial is proportional to d.

The third step of the method is selecting a user-definable bit length i of each of the first input and the second input.

The fourth step of the method is selecting a user-definable bit length cv of a check value, where cv is greater than or equal to d.

The fifth step of the method is setting n>=i+cv.

The sixth step of the method is generating the first polynomial, where the first polynomial divides $x^n+1$.

The seventh step of the method is factoring the first polynomial into a second polynomial and a third polynomial.

The eighth step of the method is receiving the first input.

The ninth step of the method is dividing the first input by the second polynomial.

The tenth step of the method is dividing the first input by the third polynomial.

The eleventh step of the method is identifying the results of the ninth step and the tenth step as a hash of the first input.

BRIEF DESCRIPTION OF THE DRAWINGS

FIG. 1 is a flowchart of the steps of the present invention.

DETAILED DESCRIPTION

The present invention is a method of collision-free hashing of near-match inputs, where a near match of two inputs to be hashed is defined as two inputs that differ in no more than a user-definable number d of bit positions.

FIG. 1 is a flow chart of the method of the present invention.

The first step 1 of the method is selecting on a computing device a user-definable minimum number of bit positions d that must differ between a first input and a second input before a collision of hashes of the first input and the second input can occur.

The second step 2 of the method is selecting on a computing device a user-definable degree of a first polynomial for a cyclic code, where the degree of the first polynomial is proportional to d.

The third step 3 of the method is selecting on a computing device a user-definable bit length i of each of the first input and the second input.

The fourth step 4 of the method is selecting on a computing device a user-definable bit length cv of a check value, where cv is greater than or equal to d.

The fifth step 5 of the method is setting on a computing device n>=i+cv.

The sixth step 6 of the method is generating on a computing device the first polynomial, where the first polynomial divides $x^n+1$.

The seventh step 7 of the method is factoring on a computing device the first polynomial into a second polynomial and a third polynomial.

The eighth step 8 of the method is receiving on a computing device the first input.

The ninth step 9 of the method is dividing on a computing device the first input by the second polynomial.

The tenth step 10 of the method is dividing on a computing device the first input by the third polynomial.

The eleventh step 11 of the method is identifying on a computing device the results of the ninth step 9 and the tenth step 10 as a hash of the first input. The results of the ninth step 9 and the tenth step 10 are combined to form the hash of the input. The combination may be a set of the two results or a user-definable mathematical or logical combination of the two results (e.g., concatenation, addition, exclusive-or, etc.).

What is claimed is:

1. A method of collision-free hashing for near-match inputs, comprising the steps of:
   a) selecting a user-definable minimum number of bit positions d that must differ between a first input and a second input before a collision of hashes of the first input and the second input can occur;
   b) selecting a user-definable degree of a first polynomial for a cyclic code, where the degree of the first polynomial is proportional to d;
   c) selecting a user-definable bit length i of each of the first input and the second input;
   d) selecting a user-definable bit length cv of a check value, where cv is greater than or equal to d;
   e) setting n>=i+cv;
   f) generating the first polynomial, where the first polynomial divides $x^n+1$;
   g) factoring the first polynomial into a second polynomial and a third polynomial;
   h) receiving the first input;
   i) dividing the first input by the second polynomial;
   j) dividing the first input by the third polynomial; and
   k) identifying the results of the ninth step and the tenth step as a hash of the first input.

2. The method of claim 1, further including the step of combining the results of step (i) and step (j) as the hash of the input using a combiner selected from the group of combiners consisting of concatenator, user-definable mathematical combiner, and user-definable logical combiner.

3. The method of claim 2, wherein said mathematical combiner is selected from the group of mathematical combiners consisting of adder, multiplier, subtractor, divider, and any combination thereof.

4. The method of claim 2, wherein said logical combiner is selected from the group of logical combiners consisting of AND, OR, NOR, NOT, XOR, XNOR, and any combination thereof.

* * * * *